(12) United States Patent
Lin

(10) Patent No.: US 7,642,937 B2
(45) Date of Patent: Jan. 5, 2010

(54) CHARACTER CONVERSION METHODS AND SYSTEMS

(75) Inventor: Cheng-Jung Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 778 days.

(21) Appl. No.: 11/327,397

(22) Filed: Jan. 9, 2006

(65) Prior Publication Data

US 2007/0159366 A1    Jul. 12, 2007

(51) Int. Cl.
*H03M 7/00* (2006.01)
(52) U.S. Cl. .......................................... 341/90; 341/50
(58) Field of Classification Search .................. 705/26, 705/27, 35; 709/224; 341/50, 90, 87
See application file for complete search history.

(56) References Cited

U.S. PATENT DOCUMENTS

| | | | |
|---|---|---|---|
| 6,314,469 B1 | 11/2001 | Tan et al. | |
| 6,345,307 B1 | 2/2002 | Booth | |
| 6,963,876 B2 | 11/2005 | Schreiber | |
| 7,086,004 B2 * | 8/2006 | Atkin | 715/205 |
| 7,278,100 B1 * | 10/2007 | Ehrman | 715/264 |
| 2004/0215647 A1 | 10/2004 | Farn et al. | |

FOREIGN PATENT DOCUMENTS

| | | |
|---|---|---|
| TW | 569592 B | 1/2004 |
| TW | 200635238 A | 10/2006 |

* cited by examiner

*Primary Examiner*—Brian Young
(74) *Attorney, Agent, or Firm*—Birch, Stewart, Kolasch & Birch, LLP

(57) ABSTRACT

Computer-implemented character conversion methods. Characters encoded in a first character set are acquired. The first character set conforms to Unicode Worldwide Character Standard and each character is encoded in first character codes according to the first character set. The first character codes of each character are then converted to numeric character references conforming to Hypertext Markup Language. The numeric character references of each character are stored using a second character set for encoding.

20 Claims, 5 Drawing Sheets

CHARACTER CONVERSION METHODS AND SYSTEMS

BACKGROUND

The present invention relates to character conversion methods, and in particular to computer-implemented character conversion methods and systems for multilingual data.

Conventionally, different regions have their own regional character encoding standards. For example, Big-5 is adopted as a character encoding standard in Taiwan, GB-2312 in China, and Shift_JIS in Japan. With the internationalization of commercial activities, an international enterprise may establish websites in different regions adopting different character encoding standards.

Due to the increase in data communication among different regions, character encoding globalization has become an inevitable trend. For example, Unicode provides an international encoding standard by assigning a unique number for every character. Unicode, officially called Unicode Worldwide Character Standard, is a system for interchange, processing, and display of written data of diverse languages. Unicode also supports classical and historical written data in multiple languages.

When source data encoded in a Unicode character set, such as UTF-8, communicates to a destination medium, e.g. a database, a file, or an application program, encoded in a regional character set, such as Big-5, data conversion problems occur.

FIG. 1 shows an embodiment of a character conversion system for different character sets. A source database 100 stores data encoded in UTF-8 and a destination database 102 stores data encoded in Big-5. If data 106 encoded in UTF-8 is transmitted from the source database 100 to the destination database 102, a converter 112 must be established in the destination database 102 for character conversion. If an application server 104 is provided in the destination side, a converter 114 must also be established in the application server 104 for character conversion. Thus, the data 106 from the source database 100 can be stored in the destination database 102 or displayed in the application server 104 correctly.

One problem of the character conversion system in FIG. 1 is that character converters must be established in every component of the destination side even if only a small amount of data is to be converted.

FIG. 2 shows an embodiment of another character conversion system for different character sets. A source database 200 stores data encoded in UTF-8 and a destination database 202 stores data encoded in Big-5. An agent 210 is established for character conversion between UTF-8 and Big-5. Data 206 encoded in UTF-8 is transmitted from the source database 200, converted by the agent 210 to data 208 encoded in Big-5, and then stored in database 202. If an application server 204 is provided in the destination side, the converted data 208 or the data stored in the database 202 can be used directly.

One problem with the character conversion system in FIG. 2 is that one agent must be established for every character conversion between two character sets, for example, UTF-8 to Big-5, UTF-8 to Shift-JIS, or UTF-8 to GB-2312, consuming considerable resources. Another problem is that UTF-8 and Big-5 character sets are not one-to-one compatible, such that some characters may be lost using a conversion agent.

SUMMARY

An embodiment of the invention provides computer-implemented character conversion methods. The methods acquire characters encoded in a first character set. The first character set conforms to Unicode Worldwide Character Standard. Each character is encoded in first character codes according to the first character set. The first character codes of each character are then converted to numeric character references. The numeric character references conform to Hypertext Markup Language, HTML. The numeric character references of each character are stored using a second character set for encoding.

BRIEF DESCRIPTION OF THE DRAWINGS

The present invention can be more fully understood by reading the subsequent detailed description and examples with references made to the accompanying drawings, wherein.

DESCRIPTION

Figure 1:
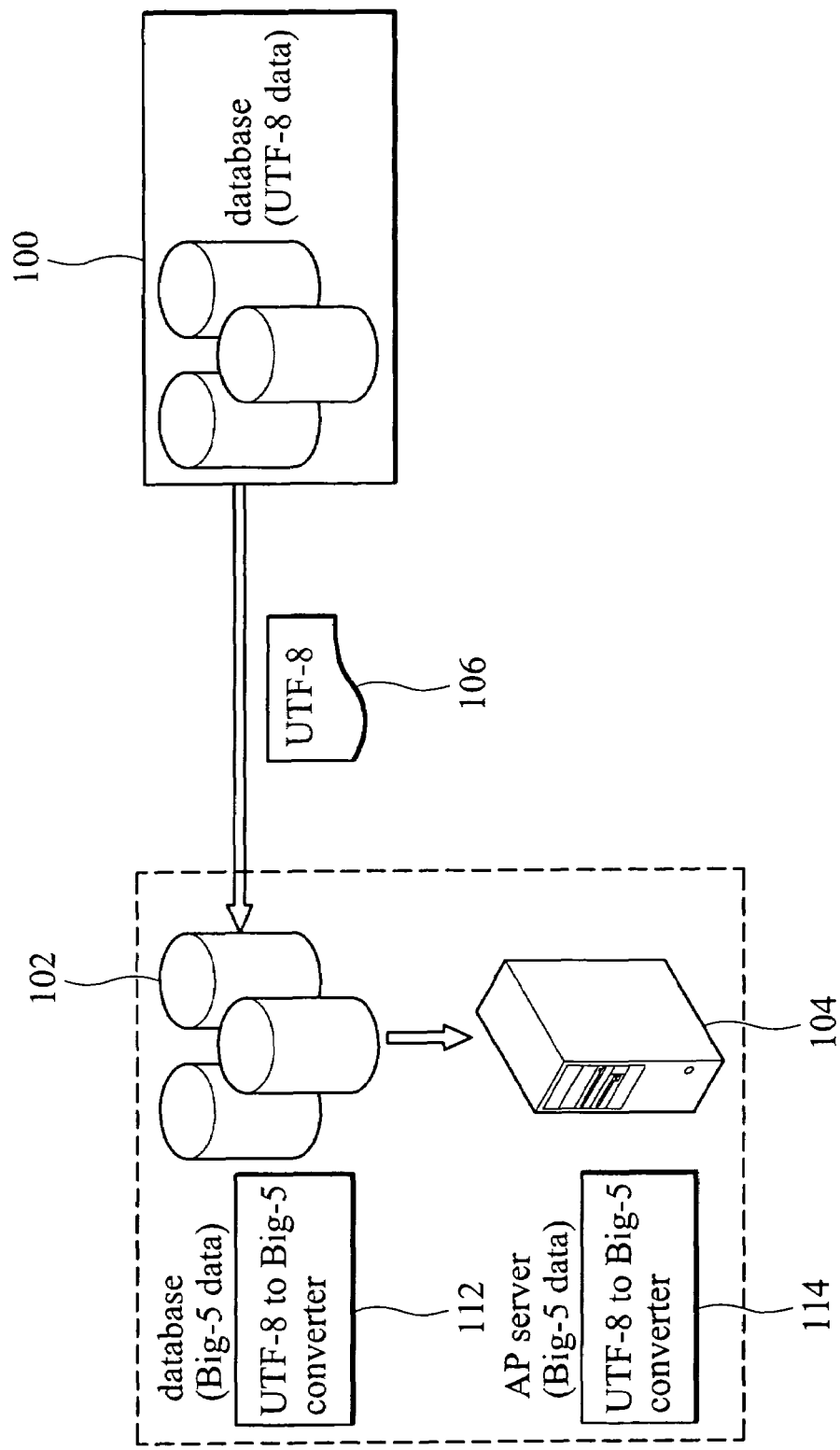
FIG. 1 shows an embodiment of a character conversion system for different character sets.
Figure 2:
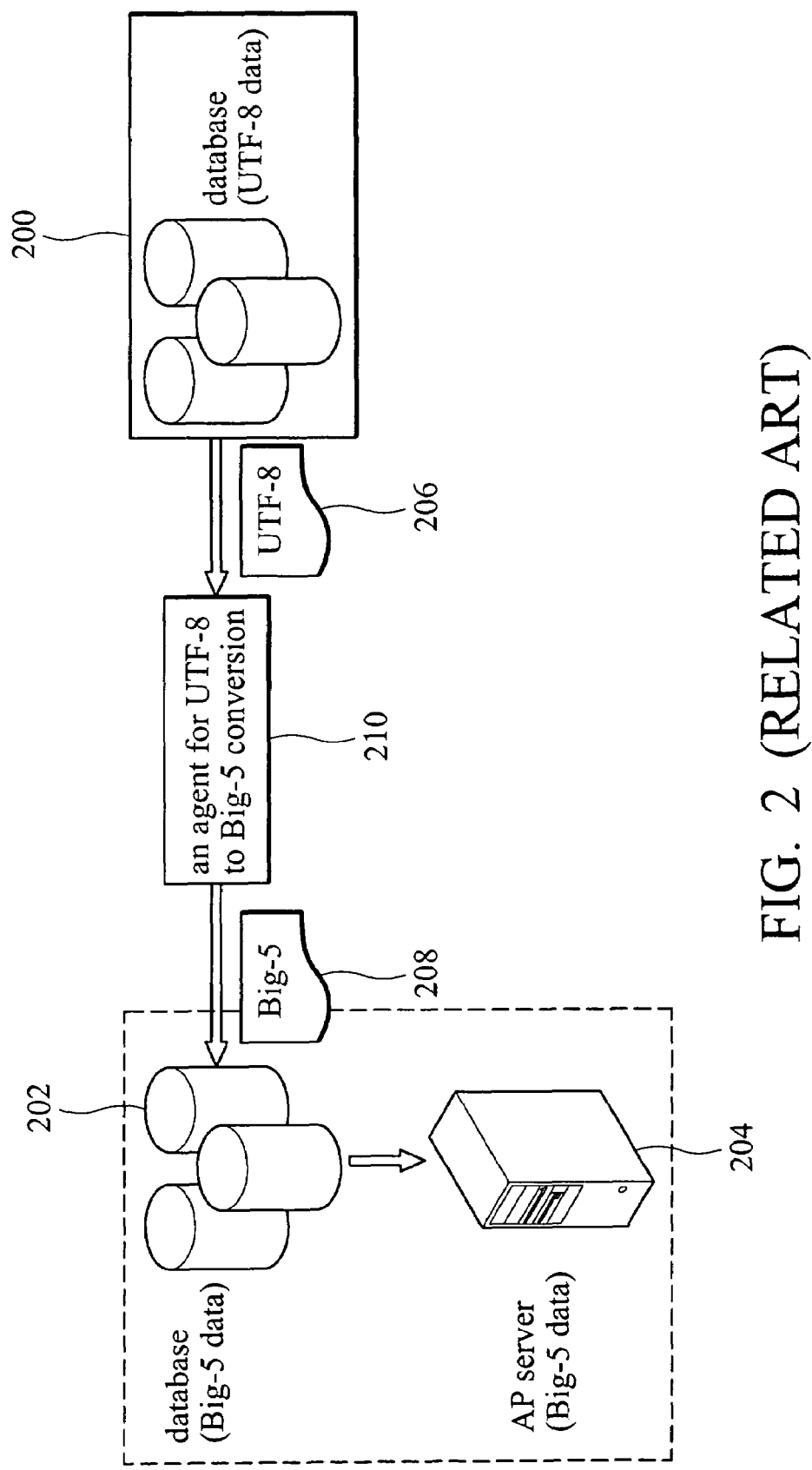
FIG. 2 shows an embodiment of another character conversion system for different character sets.
Figure 3:
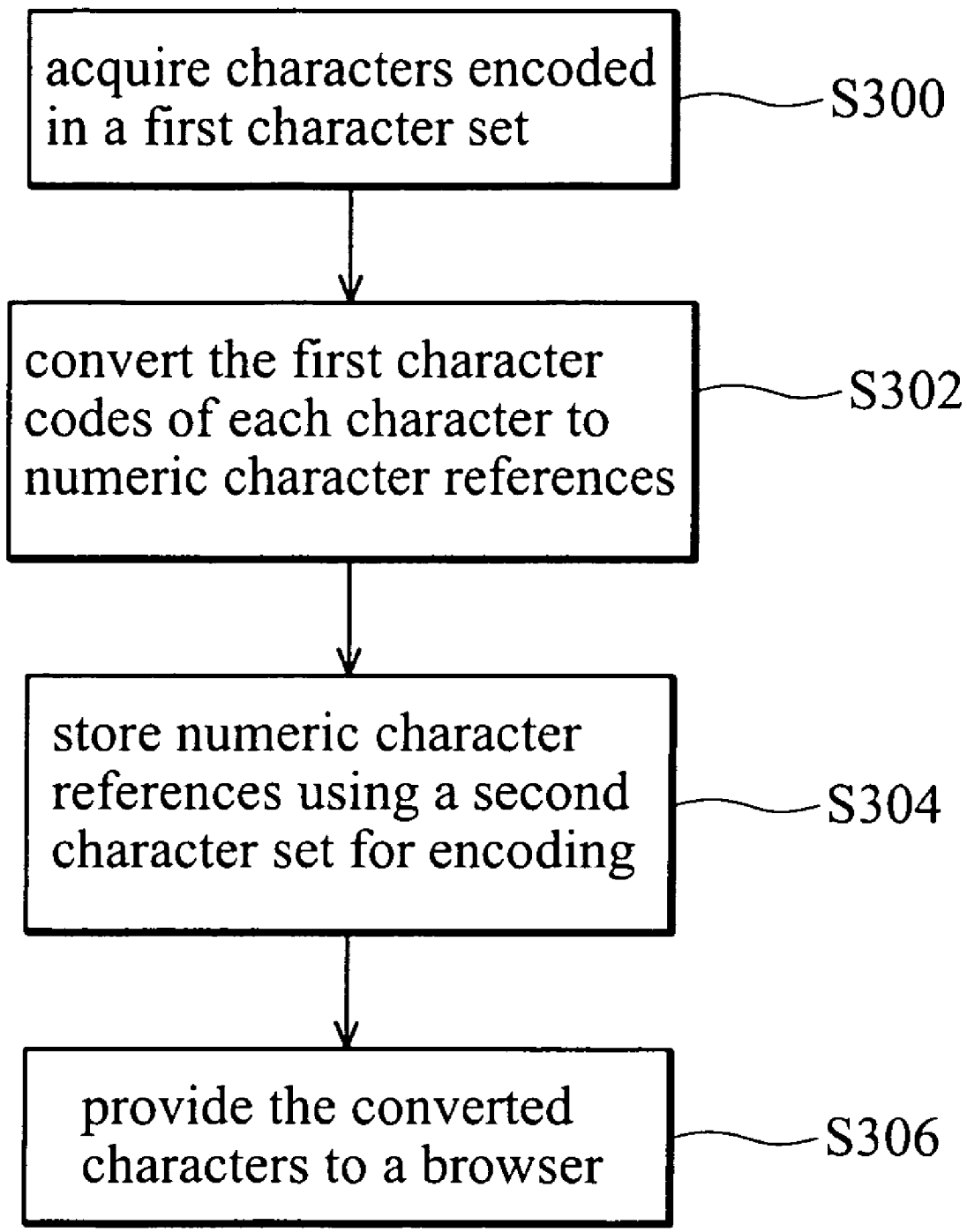
FIG. 3 is a flowchart of an embodiment of a computer-implemented character conversion method.

FIG. 3 is a flowchart of an embodiment of a computer-implemented character conversion method. Characters encoded in a first character set are acquired (step S300). For example, characters may be acquired from a database or file using the first character set for encoding. The first character set conforms to Unicode Worldwide Character Standard, such as UTF-8, UTF-16, or UTF-32 character set.

Each acquired character is encoded in first character codes according to the first character set. The first character codes of each character are converted to numeric character references (step S302). The numeric character references conform to Hypertext Markup Language, HTML. Specifically, the first codes of each character comprise control codes and numeric codes, such that the conversion extracts numeric codes from the first codes. The numeric character references are formatted in a string as "". Here, "D" is the extracted numeric codes. "&#X" is a syntax format for numeric character references. When "" is read in a HTML file by a decoder, such as a decoder of a browser, it can be recognized and decoded as a character in Unicode. Thus, the browser can display the character correctly.

Figure 5:
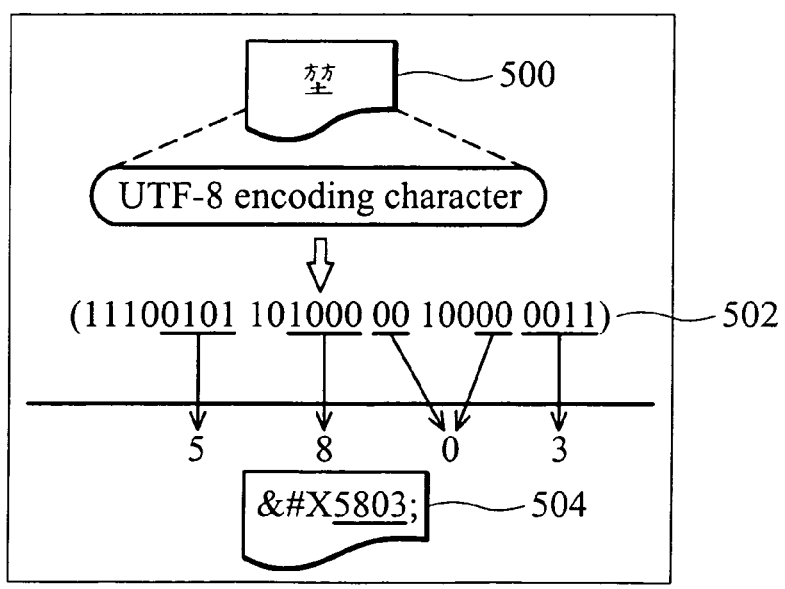
FIG. 5 is a diagram of an embodiment of numeric character references.

FIG. 5 is a diagram of an embodiment of numeric character references. "埜" 500 is a Chinese character comprised in UTF-8 but not in Big-5 character set. The first character codes of "埜" are (1110 0101 1010 0000 1000 0011) shown as 502 in FIG. 5. The first codes of "埜" comprise control codes and numeric codes. Control codes are codes without underlines, while numeric codes have underlines. Thus, the numeric codes are extracted from the first codes, i.e. (0101 1000 0000 0011), i.e. 5803 as decimals. The numeric character references are "堃" as 504 in FIG. 5.

The numeric character references of each character are stored using a second character set for encoding (step S304). The storage medium can be a database, a file, or an application program.

Thereafter, the converted characters may be provided to a World Wide Web browser page for display (step S306). Here, the World Wide Web browser page displays HTML characters.

Figure 4:
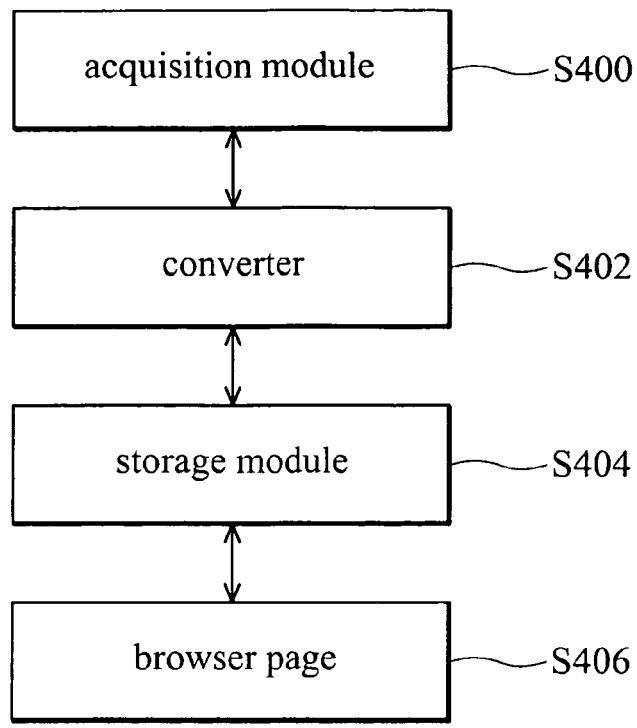
FIG. 4 is a diagram of an embodiment of a character conversion system.

FIG. 4 is a diagram of an embodiment of a character conversion system, comprising an acquisition module 400, a converter 402, and a storage module 404.

The acquisition module 400 acquires characters encoded in a first character set from a database or a file using the first character set for encoding. The first character set conforms to Unicode Worldwide Character Standard and each character is encoded in first character codes according to the first character set. The first character set can be UTF-8, UTF-16, or UTF-32 character set.

The converter 402 converts the first character codes of each character to numeric character references. Here, the numeric character references conform to Hypertext Markup Language. The first codes of each character comprise control codes and numeric codes. The converter extracts numeric codes from the first codes. The numeric character references are formatted in a string as "", wherein D is the extracted numeric codes.

The storage module 404 stores the numeric character references of each character to, for example, a file, a database, or application program, adopting a second character set for encoding.

Thereafter, the converted characters can be provided to a World Wide Web browser page 406 for display. The World Wide Web browser page 406 displays HTML characters.

Figure 6:
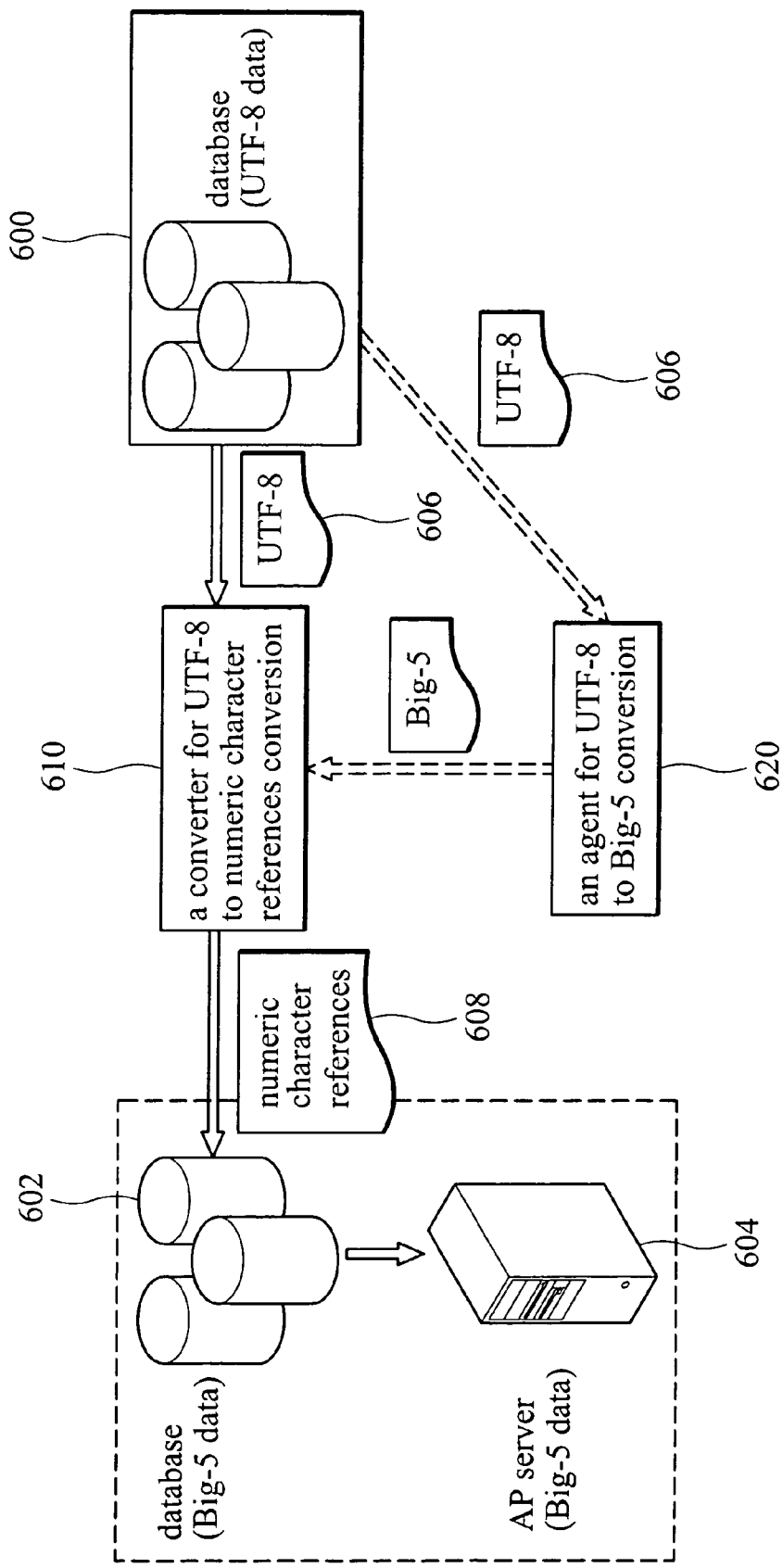
FIG. 6 shows exemplary implementation of a character conversion system.

FIG. 6 shows exemplary implementation of a character conversion system. A source database 600 stores data encoded in UTF-8 and a destination database 602 stores data encoded in Big-5. A character conversion system 610 is established. Data 606 encoded in UTF-8 is transmitted from the source database 600, converted by the system 610 to data 608 formatted in numeric character references, and then stored in database 602. If an application server 604 is provided on the destination side, the converted data 608 or the data stored in the database 602 can be used directly. Because the browser in the application server recognizes HTML data, the converted characters in numeric character references are displayed correctly.

The provided system is flexible, for example, an agent 620 can be attached in the system for converting a portion of characters directly from UTF-8 to Big-5. The inventive character conversion methods and systems accomplish character conversion of multilingual data without changing the databases or servers substantially, thereby resolving character conversion problems.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A computer-implemented character conversion method, comprising:

acquiring at least one character encoded in a first character set, wherein the first character set conforms to Unicode Worldwide Character Standard and each character is encoded in first character codes according to the first character set;

converting the first character codes of each character to numeric character references, wherein the numeric character references conform to Hypertext Markup Language; and storing the numeric character references of each character to a computer-readable medium using a second character set for encoding.

2. The computer-implemented character conversion method of claim 1, wherein the characters are acquired from a database using the first character set for encoding.

3. The computer-implemented character conversion method of claim 1, wherein the characters are acquired from a file using the first character set for encoding.

4. The computer-implemented character conversion method of claim 1, wherein the first character set is UTF-8, UTF-16, or UTF-32 character set.

5. The computer-implemented character conversion method of claim 1, wherein the first character codes of each character comprise control codes and numeric codes, and the converting step further extracts numeric codes from the first character codes.

6. The computer-implemented character conversion method of claim 5, wherein the numeric character references are formatted in a string as "", wherein D is the extracted numeric codes and "&#X" is a syntax format of the numeric character references.

7. The computer-implemented character conversion method of claim 1, wherein the converted characters are provided to a World Wide Web browser page for display, wherein the World Wide Web browser page displays characters conforming to Hypertext Markup Language.

8. The computer-implemented character conversion method of claim 1, wherein the computer-readable medium is an electronic file, and the numeric character references of each character is stored to a the electronic file using the second character set for encoding.

9. The computer-implemented character conversion method of claim 1, wherein the computer-readable medium is a database, and the numeric character references of each character is stored to a the database using the second character set for encoding.

10. The computer-implemented character conversion method of claim 1, wherein the computer-readable medium is an application program, and the numeric character references of each character is stored to the application program using the second character set for encoding.

11. A character conversion system, comprising:

an acquisition module, acquiring at least one character encoded in a first character set, wherein the first character set conforms to Unicode Worldwide Character Standard and each character is encoded in first character codes according to the first character set;

a converter, coupled to the acquisition module, converting the first character codes of each character to numeric character references, wherein the numeric character references conform to Hypertext Markup Language; and a storage module, coupled to the converter, storing the numeric character references of each character using a second character set for encoding.

12. The character conversion system of claim 11, wherein the acquisition module acquires the characters from a database using the first character set for encoding.

13. The character conversion system of claim 11, wherein the acquisition module acquires the characters from a file using the first character set for encoding.

14. The character conversion system of claim 11, wherein the first character set is UTF-8, UTF-16, or UTF-32 character set.

15. The character conversion system of claim 11, wherein the first character codes of each character comprise control codes and numeric codes, and the converter further extracts numeric codes from the first codes.

16. The character conversion system of claim 15, wherein the numeric character references are formatted in a string as "", wherein D is the extracted numeric codes.

17. The character conversion system of claim 11, wherein the converted characters are provided to a World Wide Web browser page for display, wherein the World Wide Web browser page displays characters conforming to Hypertext Markup Language.

18. The character conversion system of claim 11, wherein the numeric character references of each character is stored to a file using the second character set for encoding.

19. The character conversion system of claim 11, wherein the numeric character references of each character is stored to a database using the second character set for encoding.

20. The character conversion system of claim 11, wherein the numeric character references of each character is stored to an application program using the second character set for encoding.

* * * * *